Dec. 17, 1935.  D. E. LEWELLEN ET AL  2,024,460

VARIABLE SPEED TRANSMISSION DEVICE

Filed Sept. 22, 1932

Inventors
Darcy E. Lewellen
Emmons F. Lewellen

By  *(signature)*
Attorney

Patented Dec. 17, 1935

2,024,460

UNITED STATES PATENT OFFICE 2,024,460

VARIABLE SPEED TRANSMISSION DEVICE

Darcy E. Lewellen and Emmons F. Lewellen,
Columbus, Ind.

Application September 22, 1932, Serial No. 634,400

7 Claims. (Cl. 74—230.17)

This invention relates to improvements in variable speed transmission devices and the object of the invention is to greatly simplify mechanism of this character.

Figure 1:
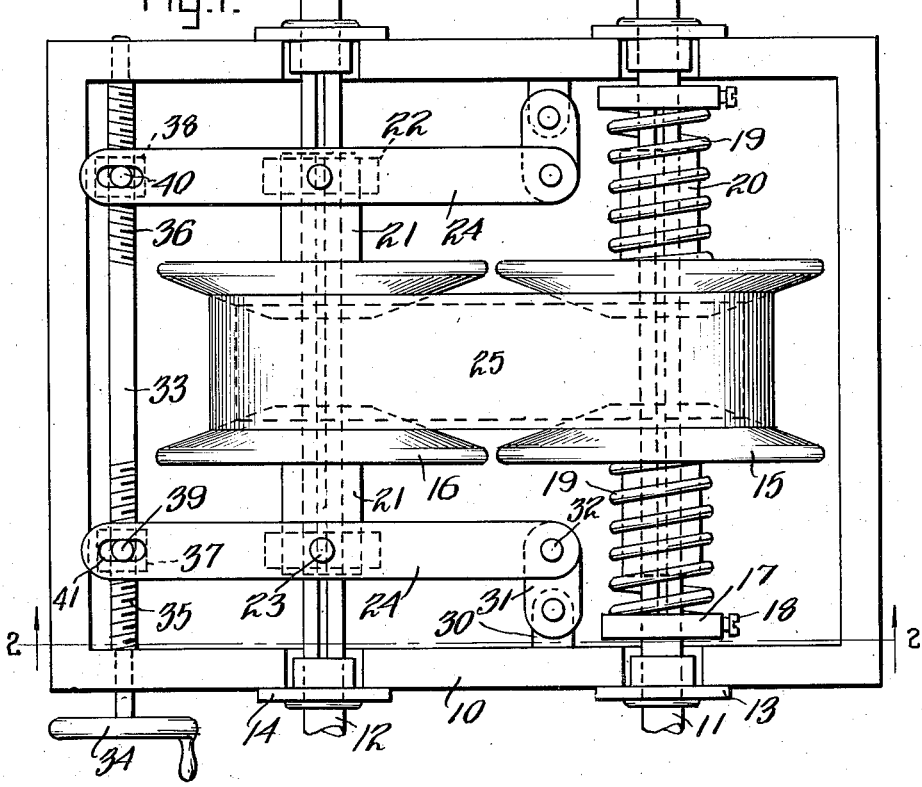
Figure 2:
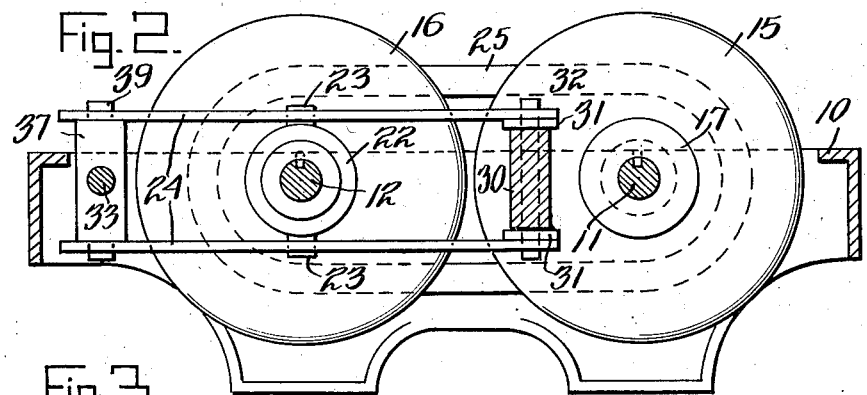
Figure 3:
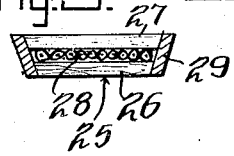

Referring to the accompanying drawing, which is made a part hereof and on which similar reference characters indicate similar parts, Figure 1 is a plan view of the device, Figure 2, a section on line 2—2 of Figure 1, Figure 3, an enlarged sectional view of the belt.

In the drawing numeral 10 indicates a frame having shafts 11 and 12 mounted in suitable bearings 13 and 14 carried by the frame. The shafts extend beyond the sides of the frame and carry suitable sprockets, pulleys or gears, not shown, by means of which the shafts are driven or by means of which they drive other mechanism. Power is applied to the sprockets, pulleys or gears of one of the shafts and power is taken off from the other shaft in a manner well-known. Shaft 11 carries conical faced disks 15 and shaft 12 carries similar disks 16. The disks 15 are splined to the shaft 11 so as to slide axially upon the shaft but are keyed to rotate with the shaft. Collars 17 are secured to shaft 11 by set screws 18. Between these collars and the outside faces of the disks 15 are positioned springs 19, the springs surrounding extensions or hub portions 20 on the disks 15. The tension of the springs 19 may be varied by adjusting the collars 17 and securing them in adjusted position by the set screws 18. The disks 16 are splined to the shaft 12 so as to rotate with the shaft but are permitted to move axially on the shaft. The disks 16 have projecting hubs 21 on which hubs are mounted thrust bearings 22. These thrust bearings have projecting bosses 23 which extend through levers 24 by means of which levers the disks 16 are moved toward and from each other.

A V-shaped belt 25 is positioned about the disks by means of which one shaft is driven by the other. The belt may be any suitable belt, the edges of which are shaped at an angle to correspond to the angle on the inner faces of the disks 15 and 16. One convenient form of belt is shown in section in Figure 3. In this figure blocks 26 and 27 are secured to a band 28 by means of bolts, rivets or any other suitable way. To the ends of the blocks 26 and 27 are attached friction tips or butts 29 which tips engage the inner conical faces of the disks 15 and 16. The disks 15 are held in engagement with the sides of the belt by means of the springs 19. Tension on these springs may be adjusted by moving the collars 17 axially along the shaft 11.

The frame 10 has inwardly extending lugs 30 to which links 31 are attached and the ends of the levers 24 are pivotally attached at 32 to the links 31. A shifting screw 33 is journaled in the frame 10 and carries an operating wheel 34 on its outer end. This screw is threaded with right and left hand threads 35 and 36 which threads extend through shifting nuts 37 and 38 respectively. These nuts have bosses 39 and 40 which extend through slots 41 in the ends of the levers 24.

From the description given it will be apparent that rotation of the hand wheel 34 in one direction will move the left end of the levers 24 toward each other and in the other direction will move these levers away from each other, thus moving the disks 16 toward or from each other. When the disks 16 are moved toward each other the inner conical face forces the belt 25 radially outwardly on the disks. While the disks 15 will be moved outwardly against the tension of springs 19 to decrease the circumference about which the belt 25 travels on the conical surfaces on the inside of the disks 15.

Either one of the shafts 11 and 12 may be the driving and the other the driven shaft.

For purposes of description assume that the shaft 11 is driven from some source of power, the shaft 12 is driven from shaft 11 and that the shaft 12 drives the mechanism which operates the work. When the shaft 33 is rotated clockwise as viewed upwardly in Figure 1 the disks 16 will be moved from each other. This permits the belt 25 to move in closer to the shaft 12. The springs 19 pressing on the disks 15 move these toward each other and the belt is caused to travel about a larger surface on the conical surface of the disks 15. Since 11 is the driving shaft this will increase the speed of the shaft 12. When the shaft 13 is rotated in a counterclockwise direction, the disks 16 will be brought toward each other so that the shaft 12 will be driven at a slower rate of speed. It will be apparent that the position of the disks 15 are at all times dependent on the position of the disks 16 and the position of the disks 16 is determined by the manually operable screw 33. Moreover the disks 15 automatically adapt themselves to the smaller or larger diameter under pressure of the springs 19.

It will be apparent that the device as a whole is extremely simple in construction and operation. It will be noted further that there are no thrust bearings on the disks 15. They are resiliently held at all times in friction driving contact with the belt 25. Only one set of disks is positively operated by the levers 24. By virtue of the bosses 23 engaging the levers and the construction and mounting of the levers 24 there is a uniform load on the thrust bearings 22 at all times.

It will be obvious to those skilled in the art that various changes may be made in our device without departing from the spirit of the invention and therefore we do not limit ourselves to what is shown in the drawing and described in the specification, but only as indicated by the appended claims.

Having thus fully described our said invention, what we claim as new and desire to secure by Letters Patent, is:

1. A variable speed transmission comprising a frame, a pair of parallel shafts journaled in the frame, a pair of disks on each shaft, said disks having adjacent cone faces, a belt about said disks having its edges in contact with the faces of the cones to transmit power from one shaft to the other, a pair of levers pivoted to the disks on one shaft for moving the said disks, and resilient means on the other shaft and biased to urge said disks toward each other to hold the cone faces in frictional and driving engagement with the edges of the belt, substantially as set forth.

2. A variable speed transmission device comprising a frame, a pair of parallel shafts mounted in the frame, a pair of disks on each shaft, said disks having adjacent cone faces, a belt mounted about said disks with its edges in contact with the cone faces on the disk for transmitting power from one shaft to the other, a pair of levers pivotally attached to the disks on one shaft, manually operable means for moving said levers simultaneously in opposite directions, and resilient means for urging the disks on the other shaft toward each other to keep them at all times in frictional driving contact with the edges of the said belt, substantially as set forth.

3. A variable speed transmission device comprising a frame having a pair of parallel shafts mounted thereon, a pair of disks on each shaft, said disks having adjacent cone faces, a belt mounted about said disks for transmitting power from one shaft to the other, a pair of springs about one shaft, said springs having their inner ends in engagement with the outer faces of the disks to urge the disks into frictional driving engagement with the said belt, a pair of levers pivotally connected to the disks on a second shaft, said levers being also connected to the said frame and an operating shaft journaled in said frame and operably connected to the said levers for moving the levers simultaneously in opposite directions, substantially as set forth.

4. A variable speed transmission device comprising a frame, a pair of parallel shafts journaled in the said frame, a pair of disks on each shaft, said disks having adjacent cone faces, a belt positioned about the said disks having its edges in frictional driving engagement with the disks for driving one shaft from the other, means for changing the relative speeds of the two shafts comprising a pair of springs on one shaft, said springs having their inner ends in engagement with the disks on this shaft for urging them toward each other, a pair of levers pivotally connected to said frame and operably connected to the disks on the other shaft for moving these disks toward and from each other, and an operating shaft journaled in the said frame and having screw threads thereon engageable with nuts on the said levers for moving the levers toward or from each other upon rotation of the said operating shaft, substantially as set forth.

5. A variable speed transmission device comprising a frame, a pair of parallel shafts mounted on the frame, a pair of disks on each shaft, said disks having adjacent cone faces, a belt trained about said disks having its edges in engagement with the cone faces on the disks for driving one shaft from the other, resilient means on one shaft positioned to urge said disks toward each other, a pair of links pivotally attached to the sides of the said frame, levers attached to the said links, said levers being pivotally attached to the disks on the other shaft, an operating shaft journaled in the said frame and connected to the said levers for moving them toward or from each other upon rotation of the operating shaft, the said resilient means moving the disks on the other shaft to maintain the belt at all times in driving contact with the said disks, substantially as set forth.

6. A variable speed transmission comprising a pair of parallel shafts journaled on fixed axes, a pair of disks on each shaft, said disks having adjacent cone faces, a belt about said disks having its edges in engagement with the faces of the cones for transmitting power from one shaft to the other, manually operable means engageable with the disks of one shaft for moving them simultaneously and equidistantly toward or away from each other, and resilient means on the other shaft and biased to urge said disks toward each other to hold the cone faces of the disks in driving engagement with the edges of the belt.

7. A variable speed transmission device comprising a frame, a pair of parallel shafts mounted on the frame, a pair of disks on each shaft, said disks having adjacent cone faces, a belt mounted about said disks with its edges in contact with the cone faces on the disks for transmitting power from one shaft to the other, an operating shaft journaled in the said frame, means engageable with the said disks and operated by said last-named shaft for moving the disks on one of the parallel shafts simultaneously and equidistantly toward and from each other, and resilient means on the other of said parallel shafts biased to urge said disks toward each other to hold the cone faces in driving contact with the edges of the belt.

DARCY E. LEWELLEN.
EMMONS F. LEWELLEN.